Jan. 10, 1950             J. HILLIER             2,494,441
METHOD AND APPARATUS FOR ELECTRONICALLY
DETERMINING PARTICLE SIZE DISTRIBUTION
Filed July 28, 1948                          2 Sheets-Sheet 1
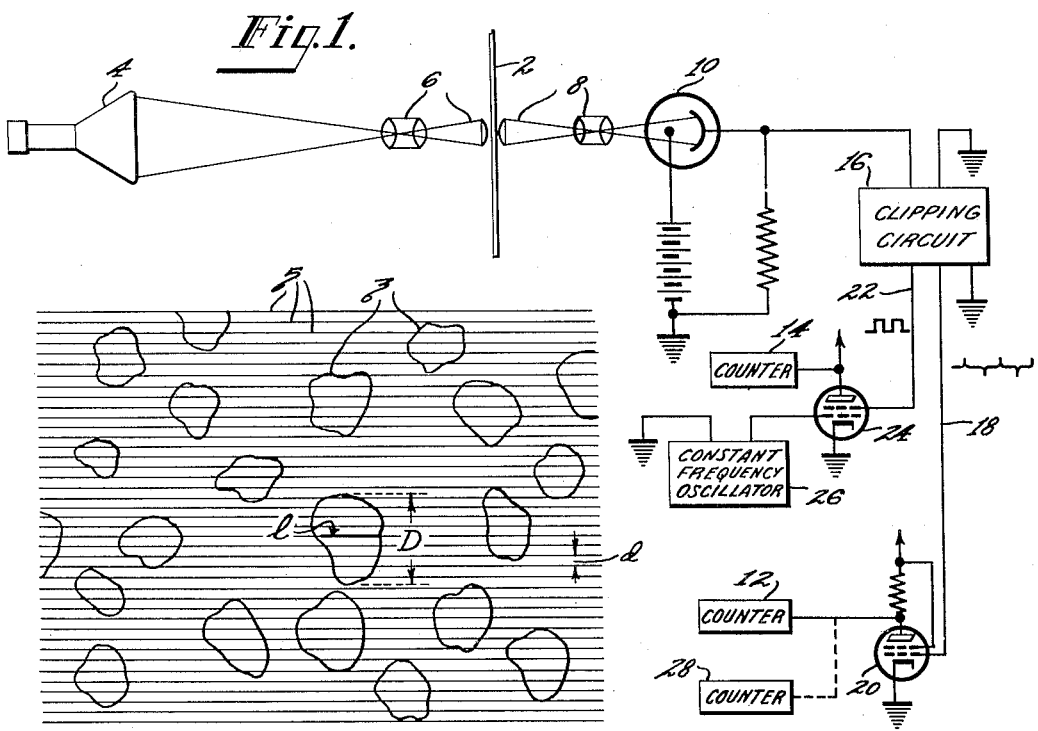
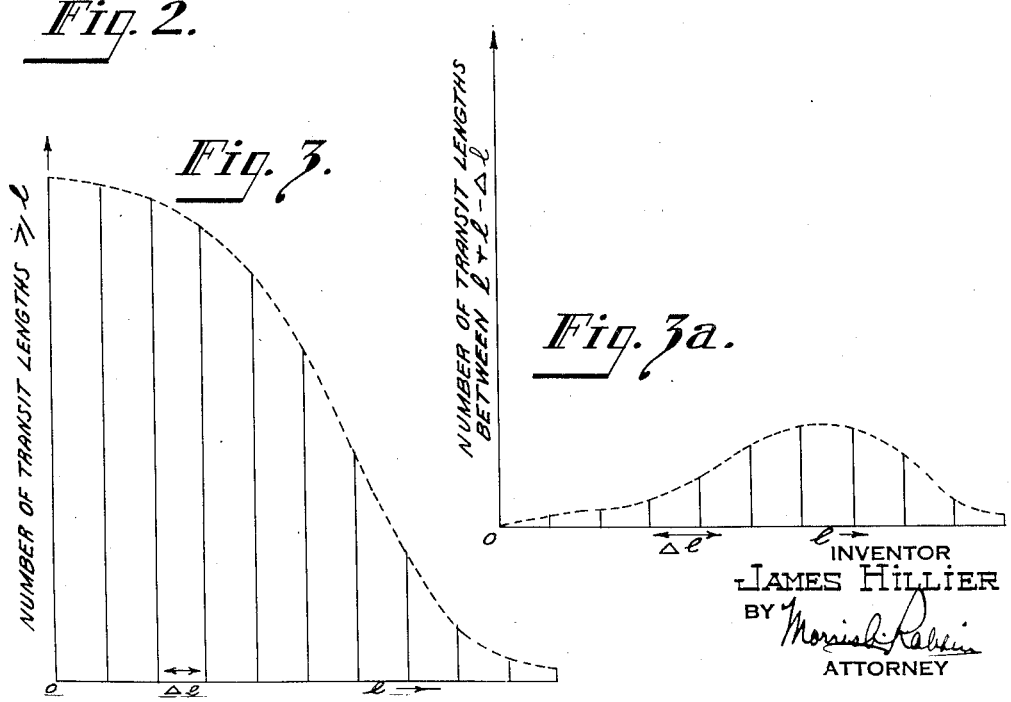
INVENTOR
JAMES HILLIER
BY
ATTORNEY Jan. 10, 1950  J. HILLIER  2,494,441
METHOD AND APPARATUS FOR ELECTRONICALLY
DETERMINING PARTICLE SIZE DISTRIBUTION
Filed July 28, 1948  2 Sheets-Sheet 2
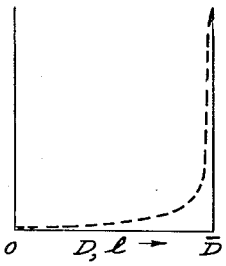
*Fig. 4.*
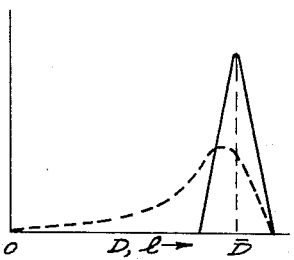
*Fig. 4a.*
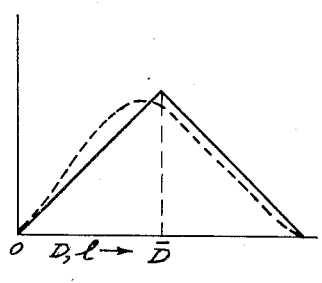
*Fig. 4b.*
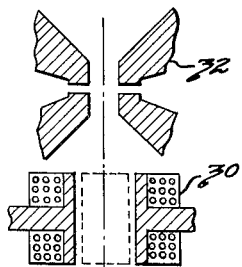
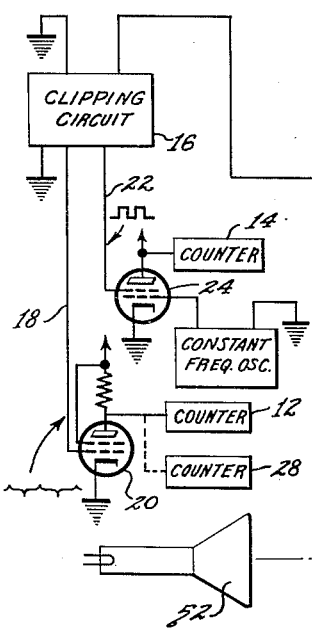
*Fig. 5.*
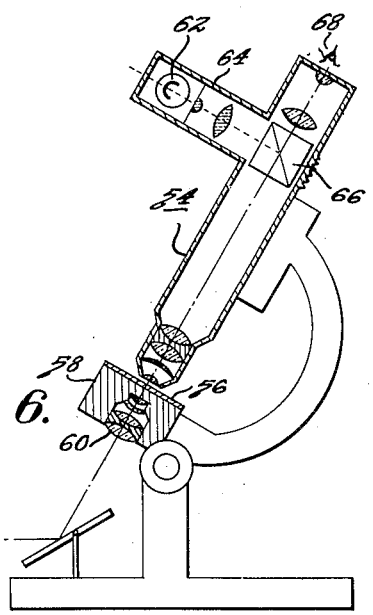
*Fig. 6.*
INVENTOR
JAMES HILLIER
BY
ATTORNEY Patented Jan. 10, 1950

2,494,441

UNITED STATES PATENT OFFICE 2,494,441

METHOD AND APPARATUS FOR ELECTRONICALLY DETERMINING PARTICLE SIZE DISTRIBUTION

James Hillier, Cranbury, N. J., assignor to Radio Corporation of America, a corporation of Delaware Application July 28, 1948, Serial No. 41,096

13 Claims. (Cl. 250—49.5)

This invention relates generally to methods and apparatus for obtaining information related to the dimensions of discrete particles spread out in a field of view. By particles is meant not only physical entities having three dimensions but any discrete areas or spots having an appearance contrasting with that of the general background.

More particularly, the invention relates to a system including means for scanning with a beam of energy a field of view in which particles appear, means for detecting changes in the intensity of the beam after it has impinged on the field of view, and means responsive to abrupt changes in said intensity for recording desired information about the field being studied. The beam of energy may be a focussed beam of light scanned mechanically, or a focussed beam of light generated by a stream of electrons striking the fluorescent surface coating of a cathode ray kinescope tube, or it may be a beam of electrons striking the field directly. The field of view may be either translucent or opaque to the beam of energy and the residual energy of the beam may thus be detected either in a transmitted ray or a reflected ray. The field may be scanned point by point or it may be imaged as a whole and the image scanned in some manner. Where scanning is referred to, it is meant to encompass either one of these equivalents. The particles being studied may appear either as portions of the field of view relatively more opaque to the impinging beam of energy or relatively more transparent thereto, or where the entire field is opaque, the particles may simply have a reflective property different from that of the general background.

An important and recurring problem in electron microscopy, as well as in light microscopy, is the determination of particle size distributions in dispersed systems. To eliminate chance variations, it is often desirable that the samples measured contain hundreds or thousands of particles. This renders the measurement of the particle diameters, eventually with the aid of a scale on an image projected on a screen, tedious and time consuming and imposes considerable strain on the eyes of the worker. The latter circumstance, furthermore, tends to reduce the accuracy of the measurements.

One object of the present invention is to provide improved apparatus and methods for obtaining certain information relating to the dimensions of discrete particles.

Another object of the invention is to provide improved apparatus and methods for determining mean particle diameter of a large number of particles.

Another object of the invention is to provide improved apparatus and methods for determining mean particle area of a large number of particles.

Another object of the invention is to provide improved apparatus and methods for determining mean square deviation in a field of observation containing a large number of particles.

Another object of the invention is to provide improved methods and apparatus for measuring particle size distribution of a large number of particles of varying sizes.

Still another object of the invention is to provide improved apparatus and methods for detecting large size particles occurring among a large number of particles of relatively small average size.

These and other objects will be more apparent and the invention will be more readily understood from a consideration of the specification when taken in conjunction with the drawings of which:

Fig. 1 is a diagrammatic view of one embodiment of apparatus for carrying out the invention, Fig. 2 is an illustration of a scanning pattern which may be utilized in the present invention, Fig. 3 is a typical distribution curve of results obtained by scanning a field of particles, showing relative numbers of transit lengths of the scanning beam equal to or greater than a series of predetermined lengths, Fig. 3a is a typical distribution curve showing relative numbers of transit lengths of the scanning beam between a predetermined length $l$ and $l$ reduced by a small decrement $\Delta l$.

Figs. 4, 4a and 4b are typical measured transit length distribution curves corresponding to different actual ideal particle diameter distribution curves where the particles are of circular projection, Fig. 5 is a view partly diagrammatic and partly in section showing how the present invention may be adapted for direct use in an electron microscope, and Fig. 6 is a view partly diagrammatic and partly in section showing how the invention may be adapted for direct use in a light microscope.

In one embodiment of the invention, as shown in Figs. 1 and 2, a photomicrograph 2 or electron micrograph transparency may be made of an area containing particles 3 to be studied. This is scanned with a device comprising a kinescope tube 4 on the fluorescent screen of which is produced a raster used as a flying-spot light source and a lens system 6 to image the raster on the transparency 2. Another lens system 8 may be used to focus the light transmitted through the transparency during the scanning process, on a photoelectric cell 10, the output of which is connected to a counting system which comprises a first counter 12 for counting the total number of transits made by the beam across the particles, and a second counter 14 for determination of total particle area.

These counters may be of the general type described in the "RCA Review," vol. 7, No. 3, Sept. 1946, page 442 (article by I Grosdoff) or more particularly described in the copending application of I. Grosdoff, Serial No. 672,748, filed May 28, 1946.

The output from photocell 10 may be first amplified, if desired, then fed to a clipping circuit 16 such as described in the copending application of I. Grosdoff, Serial No. 28,351, filed May 21, 1948. This type of circuit has an output capacitor from one side of which may be obtained a pulsed output and from the other side of which may be obtained a square wave output.

The pulsed output is fed over a conductor 18 to the grid of a coupling tube 20. The counter 12 for counting number of transits is connected to the anode of the coupling tube.

The square wave output of the clipping circuit is fed over another conductor 22 to a grid of another coupling tube 24, which may be a tetrode. To the other grid of this second coupling tube is fed the output of a constant frequency oscillator 26. The second counter 14, for obtaining total length of all transits is connected to the anode of the second coupling tube 24. Its results are accomplished by counting the total number of evenly spaced pulses from the oscillator 26 which occur during the time the scanning beam is traversing particles. Although the oscillator is on continuously, the coupling tube 24 conducts only when the grid connected to the square wave output side of the clipping circuit is sufficiently positive with respect to the cathode to permit electron current to flow in the tube from cathode to anode.

This system can be used in the following manner to obtain various types of information about the particles.

If the flying-spot scanning pattern is imaged on the area of the transparency to be measured, a scanning line may be produced having a trace 5, as shown in Fig. 2, across the images of particles in the scanned area of the plate. The separation $d$ of the scanning lines of the trace 5 is assumed small compared to the dimensions of the smallest particles to be measured.

If the total number of particles in this area is N, the mean dimension D of a particle in a direction perpendicular to the direction of scanning is $$\overline{D}=\frac{d\Sigma n_i}{N}$$

where $n_i$ is the number of times the spot crosses the $i$th particle. Furthermore, the mean projected area, $\overline{A}$, of a particle is given by the sum of the lengths of the traces, $l$, of the beam across all of the particles multiplied by $d$ and divided by N:

$$\overline{A}=\frac{d\Sigma l}{N}$$

If $t_1$ is the total time in a scanning period (for the entire field) during which the scanning beam passes over particles (i. e., the total time during which there is evidenced a distinct rise or a distinct fall in photocurrent compared with the normal background current depending upon whether a negative or a positive reproduction of the dispersed particles is being observed) if T is the time of scan of a scanning line, and if L is the length of the scanning line, then $$\Sigma l = L\frac{t_1}{T} \text{ and } \overline{A}=\frac{dL}{T}\times\frac{t_1}{N}$$

Apart from the total number of particles, the determination of mean particle diameter is thus reduced to a count of the number of transits $\Sigma n_i$ of the beam across the areas representing the particles and the determination of the mean particle area becomes a measure of the time $t_1$ spent in executing these transits.

$\Sigma n_i$ is determined by the counter 12 which is triggered every time the current output of photocell 10 exceeds or falls below, as the case may be, a certain intensity which is set intermediate between the background and the particle center photocurrent.

$t_1$, on the other hand, is measured by the cumulative counter 14 acting as an electric clock which is turned on (in the case of a negative transparency) whenever the photocurrent rises above the level just referred to and is turned off when it drops below it. For a positive transparency this action would be just the reverse and what is actually measured then is the area between particles.

If the particles are of uniform shape, a knowledge of the mean linear dimension $\overline{D}$ and the mean area $\overline{A}$ yields immediately the mean square deviation $\overline{\delta^2}$ of the linear dimension $\overline{D}$. In particular, for particles with a circular projection, where the dimension D and the diameter coincide, $$\overline{\delta^2}=\frac{\Sigma(D-\overline{D})^2}{N}=\frac{\Sigma D^2}{N}-\frac{2\overline{D}\Sigma D}{N}+\overline{D}^2=\frac{4}{\pi}\overline{A}-\overline{D}^2$$

$$\text{since } \overline{D}=\frac{\Sigma D}{N} \text{ and } \overline{A}=\frac{\Sigma A}{N}=\frac{\pi}{4}\frac{\Sigma D^2}{N}$$

For square platelets with side S, it can be shown that $$\overline{\delta^2(S)}=\overline{A}-\left(\frac{\pi\overline{D}}{4}\right)^2$$

For most purposes, a determination of mean size, i. e., mean linear dimension or mean area, and mean square deviation is adequate. However, at times, a knowledge of the actual distribution curve is desirable. This is particularly desirable when the dispersion being studied is a mixed phase system, i. e., contains several groups of particles of different mean particle size. It is then possible to obtain, by a modification of the previously described electronic system, a distribution curve for the lengths of scan across the particles, which is a close approximation to the true distribution curve for the linear dimension of the particle. The modification may consist in using a counter 28 in place of the counter 12. The counter 28 has a time constant for its charging circuit which may be set in a series of steps corresponding to the desired resolution of the distribution curve.

If, for example, the circuit is adjusted for a charging time corresponding to the linear dimension $l$, the counter will move a digit whenever the beam has traversed the image of a particle a distance $l$. At the same time, the charging circuit is opened. It is closed again as the photocurrent drops to its background value. The charging process is repeated as the beam strikes the image of the next particle and the photocurrent rises accordingly. Provision is made, of course, for discharge before the closing of the circuit after each particle scan, so that transits shorter than $l$ do not affect the recording in subsequent particle transits. Thus, the number of transit lengths greater than or equal to $l$ are counted. The differences of the values obtained as $l$ is changed in unit increments $\Delta l$ yields directly a distribution curve such as shown in Fig. 3.

The relation between the curve for the distribution of transit lengths and the distribution of particle diameters is, for circular particles, the following:

$$\bar{l} = \frac{\bar{A}}{\bar{D}} = \frac{\pi}{4}\left(\bar{D} + \frac{\bar{\delta^2}}{\bar{D}}\right)$$

Thus, for a uniform distribution ($\delta^2 = 0$), the mean value of the transit lengths is $0.785D$. With increasing nonuniformity, the mean transit length increases, becoming equal to the mean diameter for root-mean-square deviation which is 53% of the diameter.

The mean square deviation of the transit lengths is $$\overline{\delta^2(l)} = \frac{2}{3}\frac{\bar{\delta^3}}{\bar{D}} + 0.767\,\bar{\delta^2} - 0.617\frac{(\bar{\delta^2})^2}{\bar{D}} + 0.050\,\bar{D^2}$$

For a symmetrical distribution of the particles, the third deviation $\bar{\delta^3}$ drops out (the distribution curve of transit lengths is asymmetrical under these circumstances). If, furthermore, the distribution is uniform, the mean square deviation of the transit lengths is 1/20 of the square of the mean diameter. The difference between the mean square deviation of the transit lengths and the mean square deviation of the diameters decreases with increasing nonuniformity until, for $$\frac{\bar{\delta^2}}{\bar{D^2}} = 0.15$$

the two mean square deviations are approximately equal. For larger deviations, the mean square deviation of the transit lengths is less than that of the diameters.

Figs. 4, 4a and 4b are graphical illustrations which show the transit length distribution curves corresponding to different particle diameter distribution curves where the particles are of circular projection. They give some idea of the range of usefulness of the procedure of automatically recording the distribution curves of the transit lengths as described above.

In each of these figures, the solid line curve represents a particular ideal distribution of particle diameters. Thus, in Fig. 4, the solid line curve represents a dispersion in which all particles have one certain diameter $D$. In Fig. 4a, the solid line curve represents a dispersion in which the diameters of the particles have a rather narrow range of distribution on either side of the mean diameter $\bar{D}$ and in which the number of particles having a certain diameter varies in straight line relationship to the diameter. In Fig. 4b, the relationship shown by the solid line curve is also a straight line relationship but the distribution of particle diameters is much wider than in the system illustrated in Fig. 4a.

Also, in each of Figs. 4, 4a and 4b, the dotted line curve is a curve showing the corresponding distribution of transit lengths which are obtained by scanning the dispersions according to the present invention. As can be seen, the curve which can be plotted is a fairly close approximation of the actual range of particle diameters and the two curves become more nearly identical as the range of diameters becomes wider.

Since the counter system furnishing the distribution of transit lengths also furnishes the total number of transits and, hence, the mean diameter of the particles, no more than two counter systems are required under any circumstances.

The general system of the present invention, which has already been described in connection with a simple optical system for imaging a flying-spot on a photographic transparency may also be readily adapted for direct use in either an electron or a light microscope. A modification in which an electron microscope is used is illustrated in Fig. 5. In the electron microscope, a magnetic deflection system 30 may be inserted in the tube below the projector lens 32. An electrostatic deflection system may also be used in place of the electromagnetic system. The plate containing the particles being observed is inserted in the usual specimen chamber (not shown) which is above the projector lens. The fluorescent viewing screen 34 commonly included in an electron microscope may have bored therein a hole 36 large enough to accommodate a very small part of the electron beam 38.

The particle dispersion sample is then subjected to a focussed beam of electrons just as is the case when any other specimen is being observed in an electron microscope. A greatly magnified electron image of the sample is caused to be formed by the electron lens system of the instrument. This image is projected by the projector lens 32 and the image is then scanned across the tiny aperture 36 by means of the deflection yokes 30. Thus, the same effect is obtained as if the aperture were, instead, scanned across the image. The relative intensity of the electron ray passing through the aperture 36 at any instant during the scanning process will be proportional to the relative opacity of the particular minute portion of the specimen, the image of which is directly over the aperture 36 at that instant.

The electrons passing through the aperture 36 may be caused to impinge on a coating of fluorescent material 40 placed on the envelope 42 of a multiplier phototube 44 directly above the cathode 46 or they may be made to fall directly on the cathode 48 of a multiplier 50 constructed of electrodes which are not sensitive to the admission of air, such electrodes being made of a material such as a silver-magnesium alloy. In the latter case, the fluorescent coating is not necessary and, of course, the envelope of the multiplier tube is not present.

The output current of the phototube 44 or 50 will be proportional to the intensity of the electron ray striking its cathode at any instant. Just as in one of the modifications previously described, the presence of a particle will be signalled by a sharp decrease in the output current of the phototube and this will be recorded by the counter 12. Total scanning time of all particles in the sample will, as before, be recorded by the clock-type counter 14.

In still another modification of the invention, as shown in Fig. 6, a kinescope tube 52, upon the fluorescent screen of which is imposed a raster used as a flying-spot light source as shown and described in connection with Fig. 1, is used in place of the light source ordinarily used with a light microscope 54. Here, the field being observed can be a prepared slide 56 containing the particles to be studied, placed on the specimen stage 58 of the microscope. The image of the flying spot is focussed on the slide by a high quality objective lens combination 60. The phototube 62 for detecting the light changes produced by scanning the object may either be placed in the eyepiece of the microscope or, as illustrated in the figure, may be placed in a side-arm tube 64. A beam-splittting prism 66 may then be utilized for splitting the light beam received from the microscope objective so that an observer at 68 may observe the slide simultaneously as the measuring device is operating.

There has thus been described improved apparatus and methods for automatically determining information related to the dimensions of particles which may be of microscopic size. Mean particle diameter and area may be determined as well as distribution curves of these dimensions. The present invention is useful in many fields, among which are biological research in cancer study and many other problems, study of colloids and, in fact, any dispersed system of small particles.

I claim as my invention:

1. Apparatus for obtaining information related to the dimensions of discrete particles appearing in a field of view against a background contrasting in appearance with said particles, said apparatus comprising means for generating a beam of energy, means for analyzing successive parts of said field with the aid of said beam, said analyzing means including means for focussing said beam on said field, means for detecting energy changes in said beam after it has impinged on said field and counting means responsive to abrupt changes of current produced in said detecting means by said beam for indicating the number of times said abrupt changes occur.

2. Apparatus according to claim 1 in which said beam of energy is a beam of light.

3. Apparatus according to claim 1 in which said beam of energy is a beam of electrons.

4. Apparatus according to claim 1 in which said counting means includes also means for indicating the total time of duration of all of said abrupt changes.

5. Apparatus for obtaining information related to the dimensions of discrete particles appearing in a field of view against a background contrasting in appearance with said particles, said apparatus comprising means for generating a beam of energy, means for focussing said beam on said field, means for intercepting and for detecting energy changes in said beam after it has impinged on said field, means for scanning said field with a part of said beam having a cross sectional area less than that of any of said particles about which information is desired, first counting means responsive to abrupt changes of current relative to normal background current produced in said detecting means for indicating the number of traversals of said scanning beam part across particles in said field, said first counting means including means for turning on said counting means each time there occurs an abrupt change in current relative to said normal background current and second counting means for recording total time of all of said traversals.

6. Apparatus for obtaining information related to the dimensions of discrete particles appearing in a field of view against a background contrasting in appearance with said particles, said apparatus comprising a kinescope tube, means for producing a flying-spot raster on the fluorescent screen of said tube, means for imaging a light beam from said raster on said field for scanning said field, a photoelectric device for detecting changes in the intensity of said beam after it has impinged on said field and means for recording abrupt changes in the output current of said photoelectric device for counting the number of traversals of said beam across said particles.

7. Apparatus according to claim 6 in which said counting device also includes means for counting the total time of all of said traversals.

8. Apparatus for obtaining information related to the dimensions of discrete particles appearing in a field of view against a background contrasting in appearance with said particles, said apparatus comprising means for detecting changes in intensity of a beam of electrons, means for forming an electron image of said field of view, means for scanning said image such that an electron beam required from each scanned element of said image falls successively on said detecting means, and means responsive to the output current of said detecting means for counting the number of traversals made by said scanning means across said particles.

9. Apparatus according to claim 8 in which said counting means includes means for turning on said counting means each time there occurs an abrupt change in current relative to the normal background current produced in said detecting means and means for turning off said counting means each time the current drops back to said background value.

10. Apparatus according to claim 9 including also a second counter for recording the total time of traversal of said scanning beam across all of said particles.

11. Apparatus for counting a number of discrete particles which have at least a certain predetermined size and which appear in a field of view against a background contrasting in appearance with said particles, said apparatus comprising means for generating a beam of energy, means for focussing said beam on said field, means for intercepting said beam and for detecting energy changes therein after it has impinged on said field, means for scanning said field with at least a part of said beam having a cross sectional area less than that of any of said particles about which information is desired, and means for counting traversals of said beam across said particles, said counting means being responsive to abrupt changes of current relative to normal background current produced in said detecting means in response to actuation by said beam and including means for setting its charging circuit such that it will record only traversals of at least said predetermined length.

12. A method of obtaining information related to the dimensions of discrete particles appearing in a field of view against a background contrasting in appearance with said particles comprising analyzing successive parts of said field with a beam of energy, detecting abrupt changes in the intensity of said beam after it has impinged upon said field, and counting all said abrupt changes caused by said beam striking said particles.

13. Method according to claim 12 including also counting the total time of duration during which said abrupt changes persist.

JAMES HILLIER.

No references cited.